(12) United States Patent
Issa

(10) Patent No.: US 8,447,828 B2
(45) Date of Patent: May 21, 2013

(54) SYSTEM AND METHOD FOR HOSTING IMAGES EMBEDDED IN EXTERNAL WEBSITES

(75) Inventor: Alfredo C. Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 2133 days.

(21) Appl. No.: 11/231,836

(22) Filed: Sep. 21, 2005

(65) Prior Publication Data
US 2007/0067493 A1    Mar. 22, 2007

(51) Int. Cl.
*G06F 15/16*    (2006.01)

(52) U.S. Cl.
USPC .......................................................... 709/217

(58) Field of Classification Search
USPC .......................................................... 709/219
See application file for complete search history.

(56) References Cited

U.S. PATENT DOCUMENTS

| | | | |
|---|---|---|---|
| 6,035,323 A | 3/2000 | Narayen et al. | |
| 6,073,168 A | 6/2000 | Mighdoll et al. | 709/217 |
| 6,202,061 B1 | 3/2001 | Khosla et al. | |
| 6,324,545 B1 | 11/2001 | Morag | |
| 6,389,181 B2 | 5/2002 | Shaffer et al. | |
| 6,449,657 B2 | 9/2002 | Stanbach, Jr. et al. | 709/245 |
| 6,487,538 B1 | 11/2002 | Gupta et al. | 705/14 |
| 6,487,583 B1 | 11/2002 | Harvey et al. | |
| 6,490,615 B1 | 12/2002 | Dias et al. | 709/219 |
| 6,519,629 B2 | 2/2003 | Harvey et al. | |
| 6,577,311 B1 | 6/2003 | Crosby et al. | |
| 6,622,168 B1 | 9/2003 | Datta | 709/219 |
| 6,629,100 B2 | 9/2003 | Morris et al. | |
| 6,629,104 B1 | 9/2003 | Parulski et al. | |
| 6,633,850 B1 | 10/2003 | Gabbard et al. | 705/14 |
| 6,636,648 B2 | 10/2003 | Loui et al. | |
| 6,646,754 B1 | 11/2003 | Redd et al. | 358/1.13 |
| 6,704,797 B1 * | 3/2004 | Fields et al. | 709/246 |
| 6,741,864 B2 | 5/2004 | Wilcock et al. | |
| 6,754,699 B2 | 6/2004 | Swildens et al. | 709/217 |
| 6,888,569 B2 | 5/2005 | Fox et al. | |
| 6,891,635 B2 | 5/2005 | Dutta | 358/1.15 |

(Continued)

FOREIGN PATENT DOCUMENTS

| | | |
|---|---|---|
| WO | WO 2005/099165 A2 | 10/2005 |
| WO | WO 2006/026193 A2 | 3/2006 |
| WO | WO 2006/055535 A2 | 5/2006 |

OTHER PUBLICATIONS

International Search Report for PCT/US06/35904 mailed Mar. 26, 2008.

(Continued)

*Primary Examiner* — Sulaiman Nooristany
(74) *Attorney, Agent, or Firm* — Withrow & Terranova, PLLC (57) ABSTRACT

A system and method are provided for hosting digital images embedded in an external website, wherein the digital images are modified to include additional content such as advertisements when served to a guest of the external website. In general, a host website including a web server and an image database operates to host digital images for external websites. When the web server associated with the host website receives a request for a digital image embedded within a webpage of the external website, the web server analyzes metadata associated with the digital image to produce selection criteria and selects additional content to add to the digital image based on the selection criteria. The web server then modifies the digital image to include the additional content, thereby generating a modified image, and provides the modified image to the requesting node.

19 Claims, 9 Drawing Sheets

U.S. PATENT DOCUMENTS

| | | | |
|---|---|---|---|
| 6,925,485 B1 | 8/2005 | Wang et al. ............... 709/202 |
| 6,954,752 B2 | 10/2005 | Iyengar ..................... 707/8 |
| 7,062,572 B1* | 6/2006 | Hampton .................. 709/217 |
| 7,197,707 B2 | 3/2007 | Cicchitelli et al. |
| 7,266,563 B2 | 9/2007 | Morris et al. |
| 7,286,723 B2 | 10/2007 | Taugher et al. |
| 2001/0039520 A1 | 11/2001 | Nakade et al. ............ 705/27 |
| 2001/0052997 A1 | 12/2001 | Satake et al. ............ 358/1.15 |
| 2002/0103998 A1 | 8/2002 | DeBruine ................. 713/153 |
| 2002/0109729 A1* | 8/2002 | Dutta ...................... 345/790 |
| 2002/0138744 A1 | 9/2002 | Schleicher et al. ........ 713/187 |
| 2002/0188602 A1 | 12/2002 | Stubler et al. |
| 2002/0194590 A1 | 12/2002 | Pong ....................... 725/32 |
| 2003/0001903 A1 | 1/2003 | Duffy ..................... 345/810 |
| 2003/0005035 A1 | 1/2003 | Rodgers .................. 709/202 |
| 2003/0050863 A1 | 3/2003 | Radwin ................... 705/27 |
| 2003/0051255 A1 | 3/2003 | Bulman et al. |
| 2003/0063770 A1 | 4/2003 | Svendsen et al. |
| 2003/0236831 A1 | 12/2003 | Ortiz et al. ............... 709/204 |
| 2003/0236832 A1 | 12/2003 | McIntyre et al. .......... 709/204 |
| 2004/0003117 A1 | 1/2004 | McCoy et al. ............ 709/246 |
| 2004/0024828 A1 | 2/2004 | Miyagi et al. ............ 709/206 |
| 2004/0044894 A1 | 3/2004 | Lofgren et al. |
| 2004/0088348 A1 | 5/2004 | Yeager et al. ............. 709/202 |
| 2004/0117258 A1 | 6/2004 | Kanbara ................... 705/14 |
| 2004/0172419 A1 | 9/2004 | Morris et al. |
| 2004/0205168 A1 | 10/2004 | Asher |
| 2004/0207657 A1* | 10/2004 | Svendsen .................. 345/738 |
| 2004/0215523 A1 | 10/2004 | Wulff et al. ............... 705/26 |
| 2004/0215625 A1 | 10/2004 | Svendsen et al. |
| 2004/0230966 A1 | 11/2004 | Morris et al. |
| 2005/0021624 A1 | 1/2005 | Herf et al. |
| 2005/0052685 A1 | 3/2005 | Herf et al. |
| 2005/0111737 A1 | 5/2005 | Das et al. |
| 2005/0171864 A1 | 8/2005 | Nakade et al. ............ 705/26 |
| 2005/0182649 A1 | 8/2005 | Parulski |
| 2005/0193083 A1 | 9/2005 | Han et al. ................. 709/213 |
| 2005/0198191 A1 | 9/2005 | Carlson et al. ............ 709/217 |
| 2005/0289111 A1 | 12/2005 | Tribble et al. |
| 2006/0041591 A1* | 2/2006 | Rhoads ..................... 707/104.1 |
| 2006/0080286 A1 | 4/2006 | Svendsen |

OTHER PUBLICATIONS

Allan, Rob et al., "Portals and Portlets 2003," At UK National e-Science Centre in Edinburgh, Jul. 14-17, 2003.

Parker, Jason, "An Easy Way to Share Digital Photos with Others," ZDNet AnchorDesk Editorial Feature, Jun. 13, 2003, http://reviews-zdnet.com, p. 1, Jun. 3, 2003.

The Apache Software Foundation, http://www.apache.org/, Jun. 1, 2006.

Squid Web Proxy Cache, http://www.squid-cache.org/, Jun. 1, 2006.

\* cited by examiner

SYSTEM AND METHOD FOR HOSTING IMAGES EMBEDDED IN EXTERNAL WEBSITES

FIELD OF THE INVENTION

The present invention relates to hosting digital images embedded in external websites and particularly relates to adding additional content to the digital images when serving the digital images to guests of the external websites.

BACKGROUND OF THE INVENTION

Due to storage space and bandwidth requirements associated with hosting digital images in a network environment, a number of hosting websites have emerged. These hosting websites host digital images and allow the digital images to be embedded within external websites using image source references to the hosting website. In operation, when a guest requests a webpage having a digital image embedded therein from an external site, the digital image is obtained from the hosting website rather than the external website. Thus, the external website no longer needs to store the digital image or serve the digital image to the guest. As a result, the storage space and bandwidth requirements for the external website are substantially reduced.

One issue with the typical hosting website is that the hosting website may lose advertising opportunities. More specifically, the hosting website may be a photosharing website. In a normal photosharing operation, a guest views digital images at the photosharing website. While viewing the digital images, advertisements may be placed around the digital images on the webpages viewed by the guest. In contrast, when the digital images are hosted for an external website, only the image is provided to the guest node. The content surrounding the digital image on the webpage viewed by the guest is provided by the external website. Thus, the external website, rather than the hosting website, gains an advertising opportunity. Each time a digital image is served to a guest for an external website, the photosharing website loses an advertising opportunity.

Accordingly, there remains a need for a system and method for hosting digital images embedded in external websites that adds additional content such as advertisements to the digital images when serving the digital images to guests of the external websites.

SUMMARY OF THE INVENTION

The present invention provides a system and method for hosting digital images embedded in external websites, wherein the digital images are modified to include additional content such as advertisements when served to guests of the external websites. In general, a host website including a web server and an image database operates to host digital images for external websites. When the web server associated with the host website receives a request for a digital image embedded within a webpage of an external website, the web server analyzes metadata associated with the digital image to produce selection criteria and selects additional content to add to the digital image based on the selection criteria. The web server then modifies the digital image to include the additional content, thereby generating a modified image, and provides the modified image to the requesting node.

In one embodiment, the host website is a photosharing website. In this case, when the web server receives a request for a digital image, the web server determines whether the request is due to the digital image being embedded within an internal webpage of the photosharing website or an external webpage of an external website. If the request is due to the digital image being embedded within an internal webpage of the photosharing website, then the web server provides the digital image to the requesting node. If the request is due to the digital image being embedded within an external webpage of an external website, then the web server modifies the digital image to add additional content, thereby generating a modified image, and provides the modified image to the requesting node.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
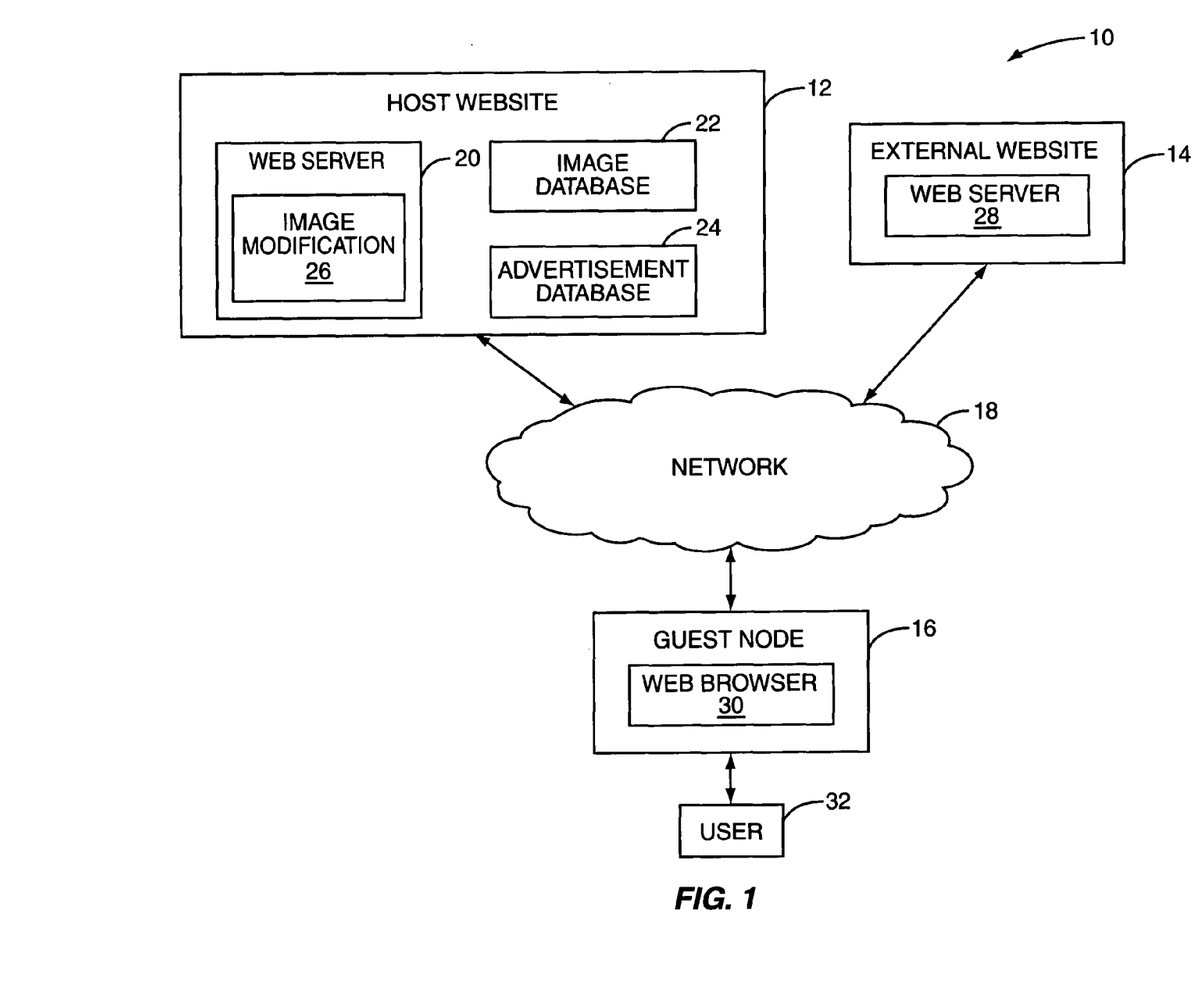
FIG. 1 is a basic block diagram of a system for adding additional content to digital images hosted by a host website and embedded into an external website when the digital images are served to guests of the external website.

The present invention provides a system and method for hosting digital images embedded in external websites, wherein additional content is added to the digital images when the digital images are served to guests of the external websites. As illustrated in FIG. 1, the present invention may be incorporated into a system 10 including a host website 12, an external website 14, and a guest node 16 interconnected by a network 18. Preferably, the network 18 is the Internet. The host website 12 includes a web server 20, an image database 22, and optionally an advertisement database 24. The web server 20 includes image modification software 26 operating to modify the digital images from the image database 22 to include additional content such as one or more advertisements, as discussed below in detail. The external website 14 includes a web server 28. The guest node 16 may be a personal computer, Personal Digital Assistant (PDA), mobile terminal, or the like and includes a web browser 30 or similar hardware or software for requesting, receiving, and displaying content from the external website 14. The guest node 16 is associated with a user 32.

Figure 2:
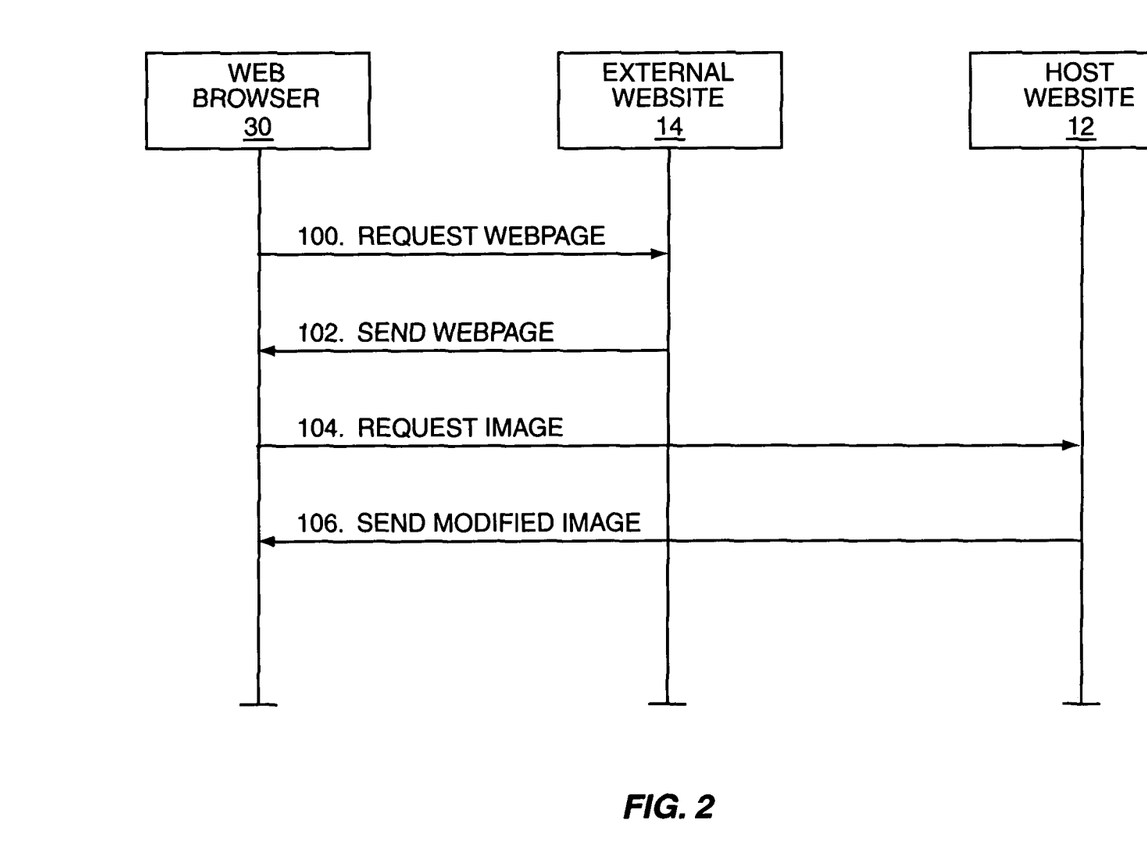
FIG. 2 illustrates the operation of the system of FIG. 1 according to one embodiment of the present invention.

FIG. 2 illustrates the operation of the system 10 of FIG. 1 according to one embodiment of the present invention. The process begins when the user 32 interacts with the web browser 30 at the guest node 16 to request a webpage from the external website 14 (step 100). Preferably, the request is a Hypertext Transfer Protocol (HTTP) request. In response, the external website sends the webpage to the web browser 30 in the form of an HTTP response (step 102). In general, the HTTP response includes the Hypertext Mark-up Language (HTML) code for the webpage. According to the present invention, one or more digital images hosted by the host website 12 are embedded within the webpage. As will be apparent to one of ordinary skill in the art upon reading this disclosure, the digital image may be embedded into the webpage using an image source reference including a Uniform Resource Locator (URL) of the digital image at the host website 12.

Upon receiving the webpage from the external website 14, the web browser 30 recognizes the image source reference to a digital image hosted by the host website 12 and sends an HTTP request to the host website 12 for the digital image (step 104). Upon receiving the HTTP request, the host website 12 recognizes that the request is for a digital image embedded within the external website 14 by, for example, examining the referrer header field in the HTTP request. As will be apparent to one of ordinary skill in the art, the HTTP request includes a referrer header field, and the URL of the webpage that leads to a request is inserted into the referrer header field. Thus, because the webpage from the external website 14 causes the web browser 30 to request the digital image from the host website 12, the web browser 30 inserts the URL of the webpage at the external website 14 into the referrer header field of the HTTP request sent to the host website 12.

After determining that the HTTP request is embedded within the external website 14, the host website 12 provides a modified version of the digital image including additional content such as one or more advertisements to the web browser 30 (step 106). For clarity, the discussion herein focuses on adding a single advertisement to the digital image. However, it is to be understood that one or more advertisements or the like may be added to a digital image to provide a modified image according to the present invention. Exemplary advertisements are "Powered by Qurio.com" or "For your vacation needs, visit travelspecialist.com." Note that the advertisements that may be used to modify the digital image may be either text based or graphic advertisements.

Figure 3:
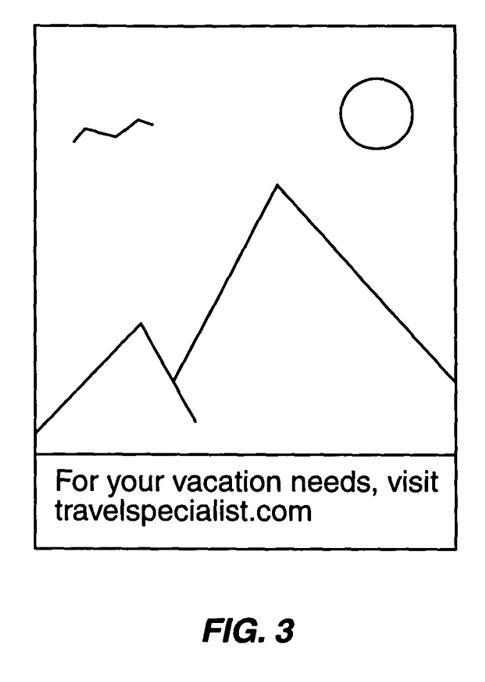
FIG. 3 illustrates an exemplary image generated by modifying a digital image to include additional content such as an advertisement according to one embodiment of the present invention.
Figure 4:
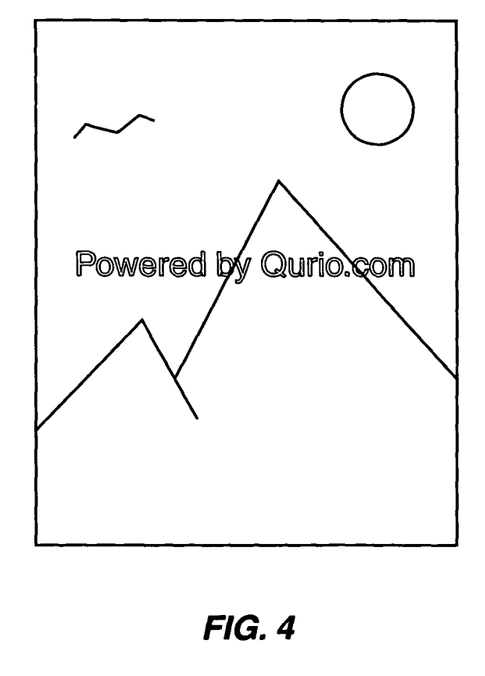
FIG. 4 illustrates another exemplary image generated by modifying a digital image to include additional content such as an advertisement according to another embodiment of the present invention.

The image modification software 26 may modify the digital image by adding pixels to the digital image such that an advertisement is placed at the bottom of the modified image, as illustrated in FIG. 3. The image modification software 26 may modify the pixels of the digital image such that an advertisement appears as a watermark in the modified image, as illustrated in FIG. 4. Numerous variations in the manner in which the digital image may be modified to form a modified image including additional content such as an advertisement will be apparent to one of ordinary skill in the art upon reading this disclosure In one embodiment, the host website 12, and more specifically the image modification software 26, retrieves the requested digital image from the image database 22 and modifies the digital image "on the fly" to insert an advertisement or the like into the digital image. More specifically, the image modification software 26 modifies the digital image "on the fly" by retrieving the requested digital image, selecting an advertisement to add to the requested digital image, and modifying the digital image to provide a modified digital image including the additional content after receiving the request for the digital image rather than at some point in time prior to receiving the request.

The modified digital image may be stored in the image database 22 or cache associated with the web server 20 and used when serving subsequent requests such that the image modification software 26 generates the modified image only once in response to the first request for the digital image. However, the image modification software 26 may alternatively generate a new modified digital image in response to each request. In another embodiment, the image modification software 26 may retrieve the digital image, modify the digital image, and store the modified digital image at some point before the HTTP request for the digital image is received from the web browser 30. Thereafter, when the HTTP request from the web browser 30 is received, the web server 20 retrieves the modified image from the image database 22 or cache associated with the web server 20 and provides the modified image to the web browser 30.

In one embodiment, the image modification software 26 selects the advertisement to add to the digital image from a number of advertisements stored in the advertisement database 24 based on metadata associated with the requested digital image. As discussed below in more detail, the image modification software 26 analyzes the metadata to provide selection criteria. Using the selection criteria, the image modification software 26 selects the advertisement to insert into the digital image from the advertisement database 24.

The metadata is data stored within or in association with the digital image file and may include various information about the digital image. For example, a digital camera used to capture the digital image may store information such as the date and time that the digital image was captured, the type of camera used to capture the digital image, the orientation of the camera, the resolution of the digital image, chromatics, light balance, flash status (on or off), ISO speed, shutter speed, exposure bias, subject distance, focal plane, self-timer, location from a Global Positioning System (GPS) receiver associated with the digital camera, and the like. The metadata may also include information such as text or audio captions, keywords, and comments added by the owner of the digital image.

In another embodiment, the image modification software 26 selects the advertisement to insert into the digital image based on a geographical location of the guest node 16. The image modification software 26 may determine the geographical location of the guest node 16 by, for example, examining the Internet Protocol (IP) address of the guest node 16.

In yet another embodiment, the image modification software 26 randomly selects the advertisement from the advertisement database 24. In yet another embodiment, the image modification software 26 adds a predetermined advertisement to the digital image. For example, the image modification software 26 may insert "Powered by Qurio.com" to digital images embedded within the external website 14.

Figure 5:
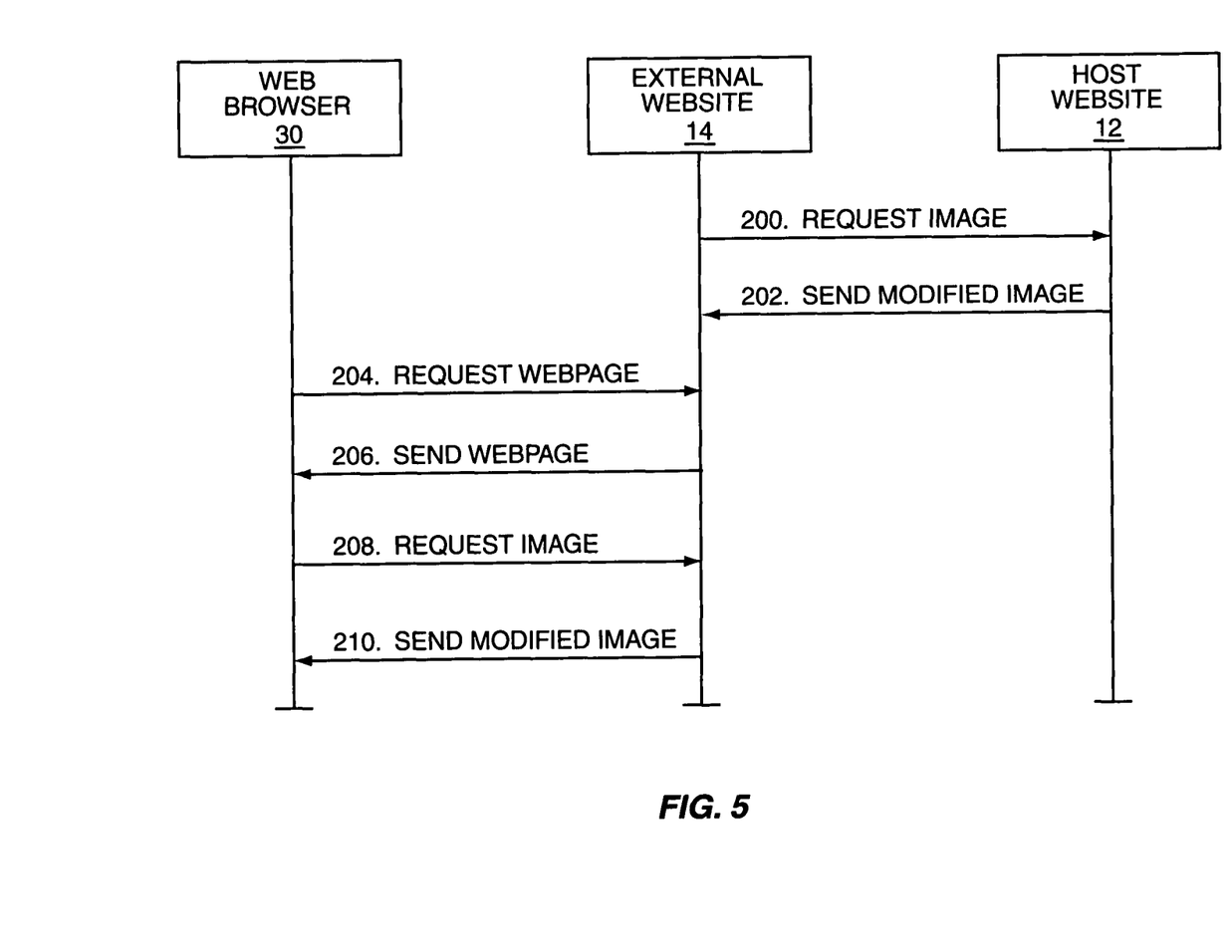
FIG. 5 illustrates the operation of the system of FIG. 1 according to a second embodiment of the present invention.

FIG. 5 illustrates the operation of the system 10 of FIG. 1 according to a second embodiment of the present invention. In this embodiment, the external website 14 obtains the modified image from the host website 12 prior to receiving a request from the web browser 30 at the guest node 16. More specifically, the external website 14 recognizes that a digital image embedded therein is hosted by the host website 12 and sends an HTTP request to the host website 12 for the digital image (step 200). The host website 12 generates an HTTP response including the modified image and sends the HTTP response to the external website 14, wherein the modified image is stored (step 202). The host website 12 may modify the digital image to provide the modified image in any of the various manners discussed above.

As some point in time after the external website 14 has obtained the modified image from the host website 12, the web browser 30 sends an HTTP request for a webpage to the external website 14 (step 204). Upon receiving the request, the external website 14 generates an HTTP response including the HTML code for the webpage to the web browser 30 (step 206). The web browser 30 recognizes the image source reference in the HTML code and requests the digital image from the external website 14 (step 208). In response, the external website 14 provides the modified image to the web browser 30 (step 210).

As an alternative, the external website 14 may request the digital image from the host website 12 after receiving the request for the webpage from the web browser 30. More specifically, the external website 14 may request the digital image from the host website 12 (step 200) after receiving the request for the webpage (step 204) or after receiving the request for the digital image (step 208).

Figure 6:
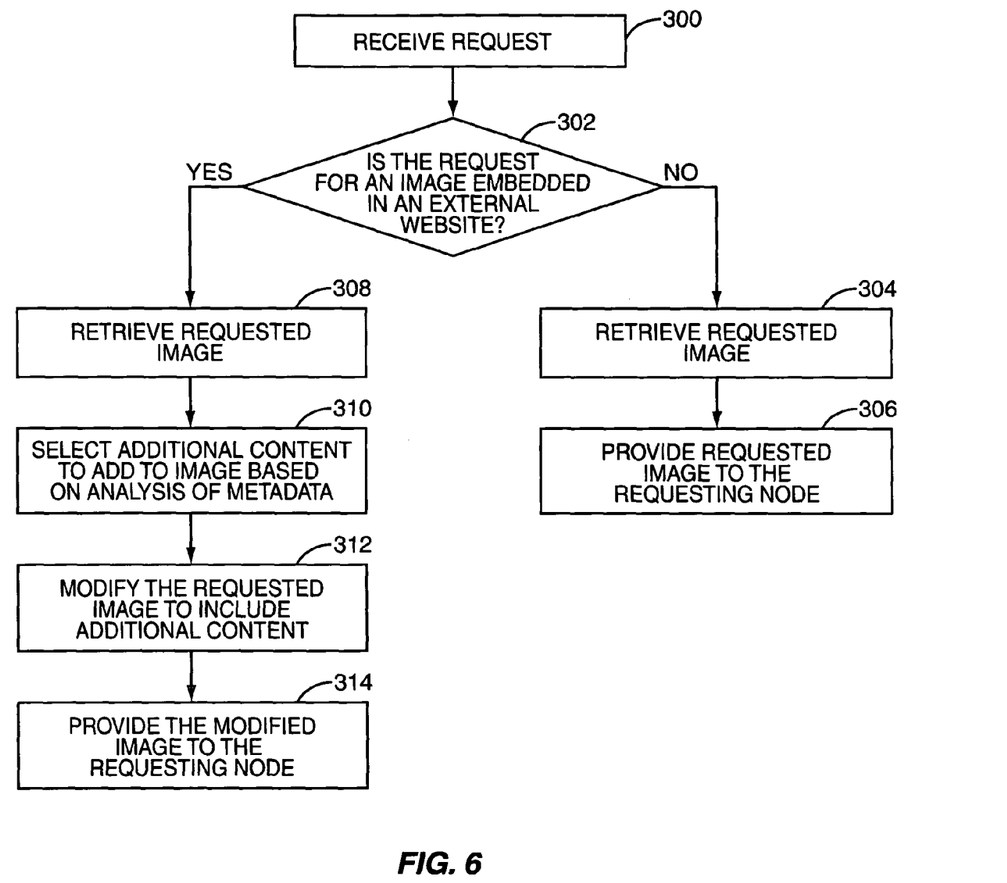
FIG. 6 is a basic flow chart illustrating the operation of the host website of FIG. 1 wherein additional content is added to a digital image based on an analysis of metadata associated with the digital image according to one embodiment of the present invention.

FIG. 6 is an exemplary flow chart illustrating the operation of the host website 12 according to one embodiment of the present invention. Note that in this embodiment, the host website 12 selects an advertisement to insert into the digital image based on an analysis of the metadata associated with the digital image. Initially, the host website 12 receives an HTTP request for a digital image (step 300). The host website 12, and specifically the web server 20, determines whether the request is for a digital image embedded in an external website (step 302). As discussed above, this may be done by examining the referrer header field of the HTTP request.

If the request is not for a digital image embedded in an external website but is rather a request for a digital image embedded within an internal webpage of the hosting website 12, then the web server 20 retrieves the requested image from the image database 22 (step 304) and provides the requested digital image to the requesting node (step 306). This may be the case where the host website 12 is a photosharing website and a user is browsing a photo album at the host website 12. For example, the photo album may be a webpage including a number of low resolution digital images, such as thumbnails. When the user desires to view a full resolution version of a digital image, he may click on the corresponding low resolution version of the digital image linking to an internal webpage. By clicking on the low resolution version of the digital image, the user's web browser sends an HTTP request to the host website 12 for the internal webpage. The internal webpage may include the full resolution version of the digital image and a number of advertisements framing the digital image. In response to the request, the host website 12 provides an HTTP response including the HTML code for the internal webpage. The user's web browser recognizes the image source reference to the digital image and sends an HTTP request for the digital image to the host website 12. However, in this case, the referrer header field includes the URL of the photo album webpage, which is an internal webpage. Thus, by examining the HTTP request for the digital image, the web server 20 determines that the request is for an internal webpage. Accordingly, the web server 20 provides the unmodified, or original, digital image rather than the modified image.

Returning to step 302, if the web server 20 determines that the request is for a digital image embedded in an external website, the web server 20 retrieves the digital image from the image database 22 (step 308). The web server 20 then selects additional content, such as an advertisement, to add to the digital image based on an analysis of the metadata (step 310). More specifically, the image modification software 26 analyzes the metadata associated with the digital image to provide selection criteria. Using the selection criteria, the image modification software 26 selects the advertisement to insert into the digital image from the advertisement database 24.

In one embodiment, the image modification software 26 analyzes the metadata by searching captions and/or keywords stored in the metadata for predetermined keywords, where the keywords found during the search are the selection criteria. The captions may be text or audio. For example, if the word "beach" or "ocean" is used in the captions, then the image modification software 26 may select "For your vacation needs, visit orbitz.com."

The image modification software 26 may additionally or alternatively analyze the metadata by searching for location information in the metadata from a GPS receiver or the like associated with the digital camera used to capture the digital image. The location information may be in terms of latitude and longitude. In this case, the image modification software 26 may convert the location information to a name or descriptor of the particular location. For example, the image modification software 26 may convert a latitude and longitude into a city name, such as New York, N.Y. As another example, the image modification software 26 may determine that the pictures were taken at a beach or in a mountainous region based on latitude and longitude. Whether the location information is a city name or a descriptor such as "beach" or "mountains," the image modification software 26 uses the location information as the selection criteria and selects an advertisement based on the location information.

The image modification software 26 may additionally or alternatively analyze the metadata by searching the metadata for a date and/or time at which the digital image was captured, where the date and time are the selection criteria. For example, if the digital image was captured on Christmas, then the image modification software 26 may select an advertisement or other content associated with Christmas.

After selecting the additional content to add to the digital image, the image modification software 26 modifies the image to include the additional content (step 312). More specifically, the image modification software 26 may add pixels to the digital image such that an advertisement is added to the bottom of the digital image (FIG. 3), the top of the digital image, or on one or both of the sides of the digital image. Alternatively, the image modification software 26 may modify the pixels of the digital image such that the advertisement or additional content appears as a watermark (FIG. 4).

After generating the modified image, the modified image is provided to the requesting node (step 314). The requesting node may be either the guest node 16 as discussed above with respect to FIG. 2 or the external website 14 as discussed above with respect to FIG. 5. In addition, the modified image may be stored either in the image database 22 or in cache associated with the web server 20 and used for subsequent requests.

Figure 7:
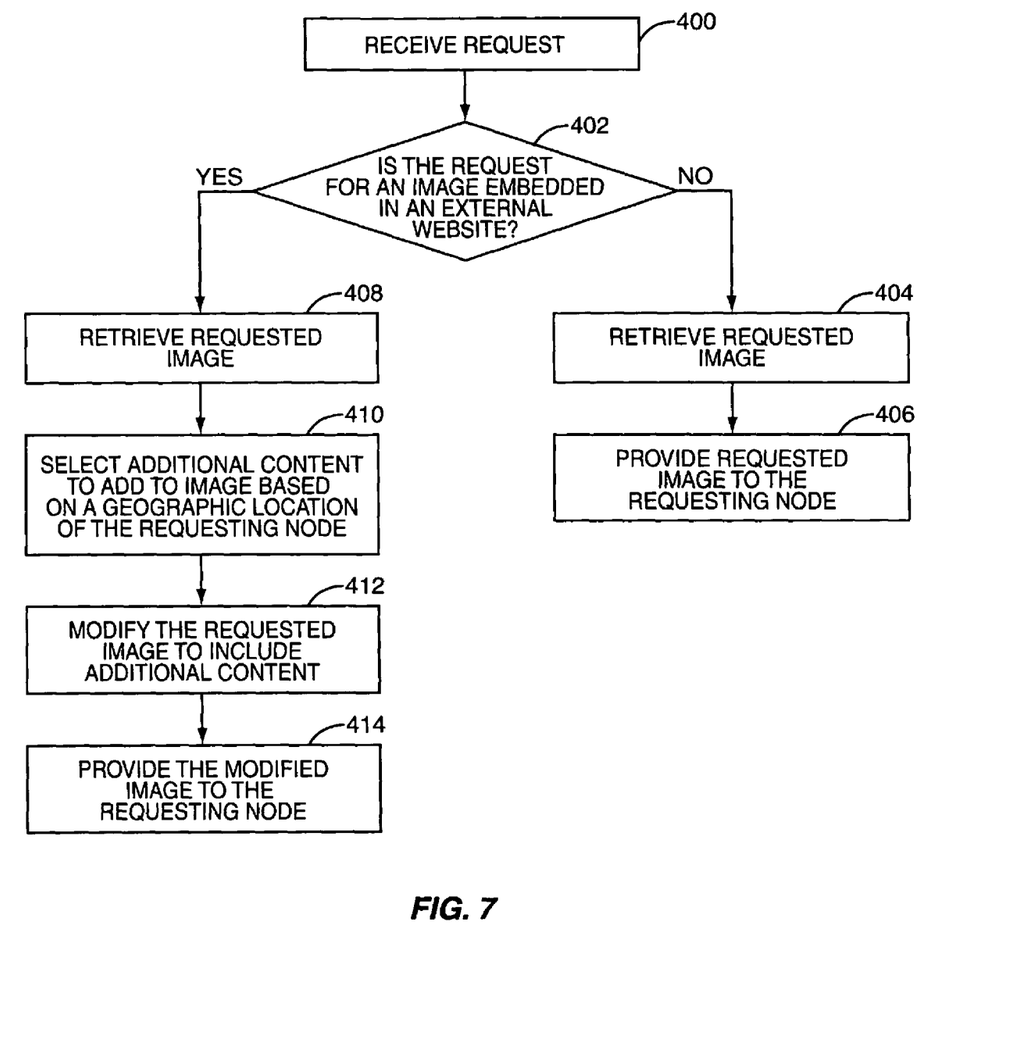
FIG. 7 is a basic flow chart illustrating the operation of the host website of FIG. 1 wherein additional content is added to a digital image based on a geographic location of the requesting node according to another embodiment of the present invention.

FIG. 7 is an exemplary flow chart illustrating the operation of the host website 12 according to another embodiment of the present invention. Note that in this embodiment, the host website 12 selects an advertisement to insert into the digital image based on the geographic location of the guest node 16. This embodiment is substantially the same as that discussed above with respect to FIG. 6 with the difference being in step 410, as compared to step 310 of FIG. 6.

Initially, the host website 12 receives an HTTP request for a digital image (step 400). The host website 12, and specifically the web server 20, determines whether the request is for a digital image embedded in an external website (step 402). As discussed above, this may be done by examining the referrer header field of the HTTP request. If the request is not for a digital image embedded in an external website but is rather a request for a digital image embedded within an internal webpage, then the web server 20 retrieves the requested image from the image database 22 (step 404) and provides the requested digital image to the requesting node (step 406).

If the web server 20 determines that the request is for a digital image embedded in an external website, the web server 20 retrieves the digital image from the image database 22 (step 408) and selects additional content, such as an advertisement, to add to the digital image based on a geographic location of the guest node 16 (step 410). More specifically, the image modification software 26 determines the geographic location of the guest node 16 based on an IP address of the guest node 16. As will be apparent to one of ordinary skill in the art, the IP address of the guest node 16 is known to the host website 12 as a result of the connection between the host website 12 and the guest node 16.

After selecting the additional content to add to the digital image, the image modification software 26 modifies the image to include the additional content (step 412). After generating the modified image, the modified image is provided to the requesting node (step 414). The requesting node may be either the guest node 16 as discussed above with respect to FIG. 2 or the external website 14 as discussed above with respect to FIG. 5. In addition, the modified image may be stored either in the image database 22 or in cache associated with the web server 20 and used for subsequent requests.

Figure 8:
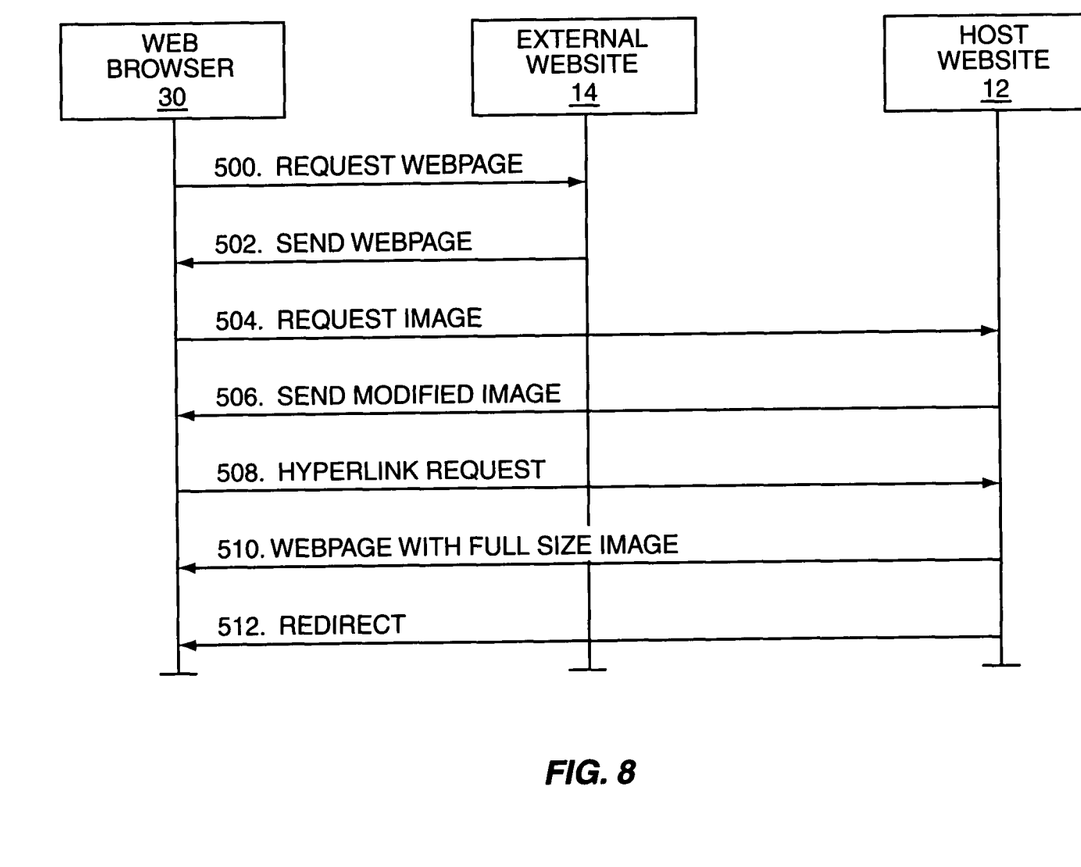
FIG. 8 illustrates the operation of the system of FIG. 1 wherein a digital image is embedded into an external website as a web hyperlink according to a third embodiment of the present invention.
Figure 9:
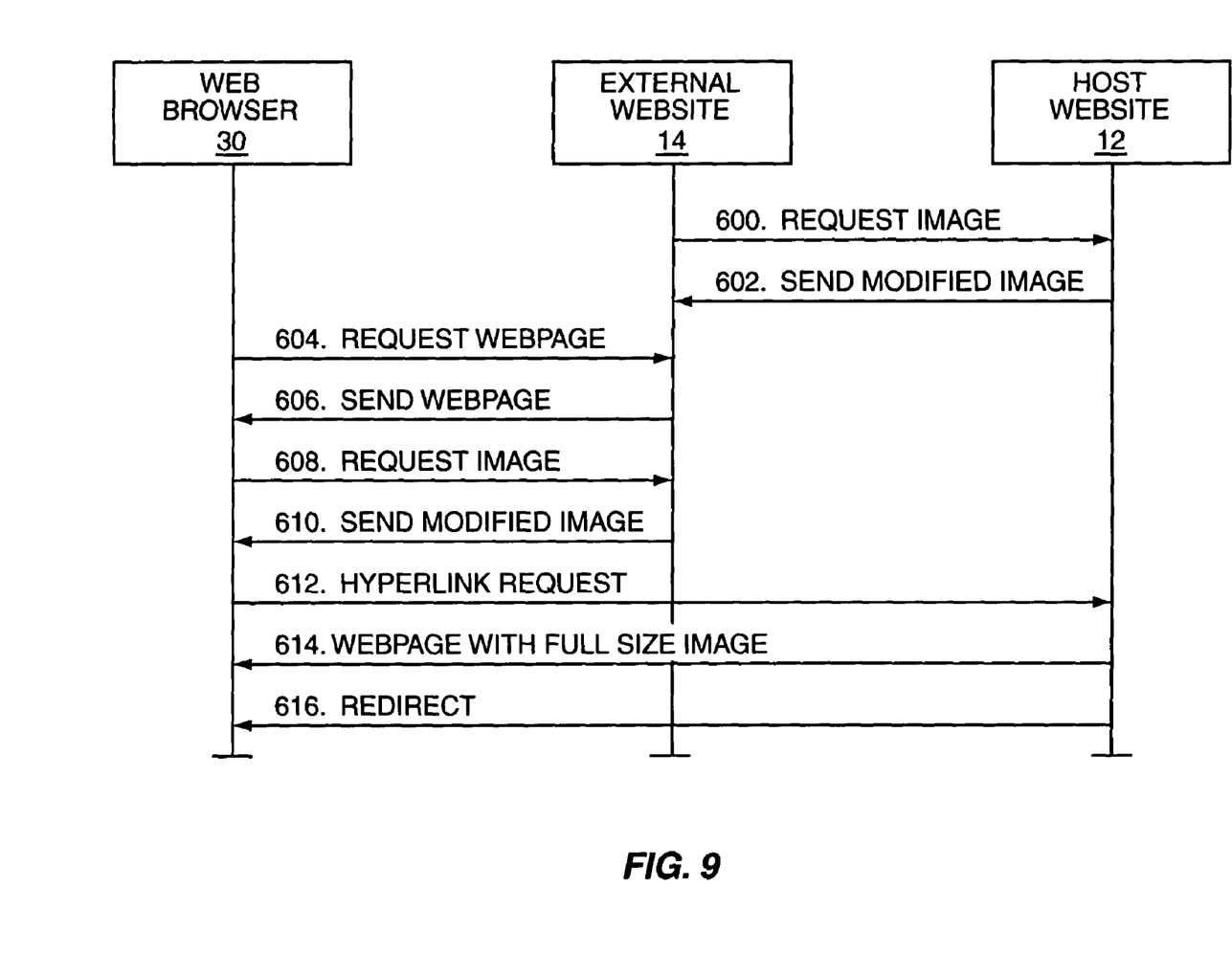
FIG. 9 illustrates the operation of the system of FIG. 1 wherein a digital image is embedded into an external website as a web hyperlink according to a fourth embodiment of the present invention.

FIGS. 8 and 9 are similar to FIGS. 2 and 5. However, in these two embodiments, the modified image embedded in the external website 14 is made "clickable" by embedding the image as a web hyperlink. Referring to FIG. 8, the web browser 30 first sends a request to the external website 14 for a webpage (step 500). The external website 14 returns the HTML code for the webpage via an HTTP response (step 502). The webpage includes an image source reference for a digital image hosted by the host website 12, wherein the webpage embeds the digital image as a web hyperlink. The URL for the web hyperlink is predetermined by, for example, an agreement between the operators of the host website 12 and the external website 14. Preferably, the web hyperlink directs the web browser 30 to the host website 12, which may in turn redirect the web browser 30 to a website referenced by the advertisement in the modified image.

After receiving the HTTP response from the external website 14, the web browser 30 recognizes the image source reference for the digital image and requests the digital image from the host website 12 (step 504). In response, the host website 12 returns the modified image including an advertisement to the web browser 30 (step 506). At some point, the user 32 (FIG. 1) becomes interested in either the modified image or the advertisement in the modified image and activates the web hyperlink by "clicking" on the modified image. As a result, the web browser 30 sends an HTTP request, which is also referred to herein as a hyperlink request, to the host website 12 (step 508).

In this embodiment, the host website 12 responds by sending an HTTP response including HTML code for a webpage including a full resolution version of the modified image or the digital image used to generate the modified image (step 510). In this webpage, the image may optionally be framed with additional advertisements. Then, after some predetermined amount of time, the host website 12 sends an HTTP redirect message to the web browser 30 to redirect the web browser 30 to a website referenced in the advertisement in the modified image (step 512).

The host website 12 may determine the URL for the website referenced in the advertisement in the modified image based on information such as indicia identifying the modified image. More specifically, in one embodiment, the URL for the web hyperlink may include either the file name of the modified image or some other indicia identifying the modified image. Upon receiving the hyperlink request from the web browser 30, the host website 12 examines the query to identify the modified image used as the web hyperlink. Then, using a look-up table storing indicia of the advertisement used to modify each image and/or a URL for a website referenced in the advertisement, the host website 12 determines the URL for the website referenced in the advertisement in the modified image. Other information such as the referrer header field in the HTTP request and the IP address of the guest node 16 may alternatively or additionally be used to determine the advertisement in the modified image. The IP address of the guest node 16 may be needed when the advertisement used to generate the modified image was selected based on the geographic location of the guest node 16, where the geographic location of the guest node 16 may be determined using the IP address of the guest node 16.

Rather than providing the webpage including the full resolution version of either the modified image or the digital image used to generate the modified image, the host website 12 may alternatively redirect the web browser 30 to the website referenced in the advertisement immediately after receiving the hyperlink request from the web browser 30 and determining the URL for the website referenced in the advertisement in the modified image. As another alternative, the host website 12 may not redirect the web browser 30. Instead, the host website 32 may provide a webpage including a full resolution version of either the digital image from which the modified image was generated or the modified image and additional advertisements. These advertisements may or may not be associated with the advertisement in the modified image.

FIG. 9 is similar to FIG. 8 except that the external website 14, rather than the web browser 30, requests the digital image from the host website 12, as described above with respect to FIG. 5. In this embodiment, the external website 14 requests a digital image from the host website 12 (step 600), and the host website 12 returns a modified image to the external website 14 (step 602). The web browser 30 sends a request to the external website 14 for a webpage (step 604), and the external website 14 returns the HTML code for the webpage via an HTTP response (step 606). The webpage includes an image source reference for the digital image hosted by the host website 12, wherein the webpage embeds the digital image as a web hyperlink. The URL for the web hyperlink is predetermined by, for example, an agreement between the operators of the host website 12 and the external website 14. Preferably, the web hyperlink directs the web browser 30 to the host website 12, which may in turn redirect the web browser 30 to a website referenced by the advertisement in the modified image.

After receiving the HTTP response from the external website 14, the web browser 30 recognizes the image source reference for the digital image and requests the digital image from the external website 14 (step 608). In response, the external website 14 returns the modified image including an advertisement to the web browser 30 (step 610). At some point, the user 32 (FIG. 1) becomes interested in either the modified image or the advertisement in the modified image and activates the web hyperlink by "clicking" on the modified image. As a result, the web browser 30 sends an HTTP request, which is also referred to herein as a hyperlink request, to the host website 12 (step 612).

In this embodiment, the host website 12 responds by sending an HTTP response including HTML code for a webpage including a full resolution version of the modified image or the digital image used to generate the modified image (step 614). In this webpage, the image may optionally be framed with additional advertisements. Then, after some predetermined amount of time, the host website 12 sends an HTTP redirect message to the web browser 30 to redirect the web browser 30 to a website referenced in the advertisement in the modified image (step 616).

Figure 10:
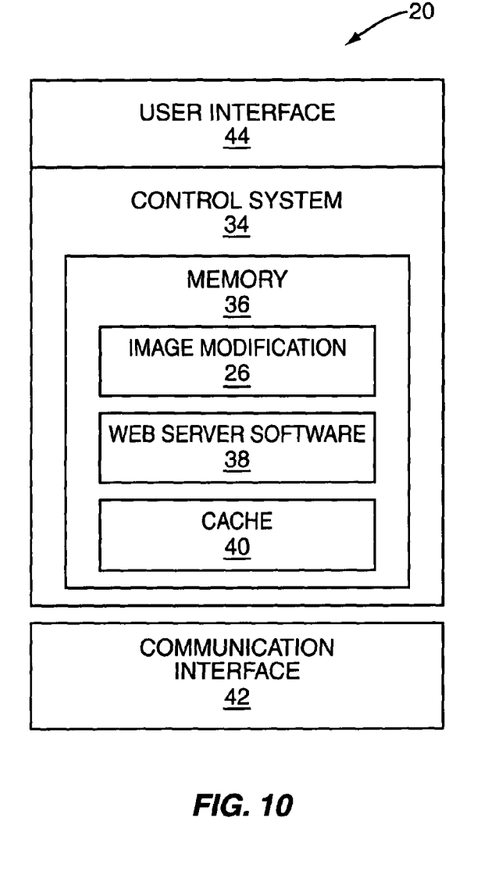
FIG. 10 is a basic block diagram of the web server associated with the host website of FIG. 1 according to one embodiment of the present invention.

FIG. 10 illustrates a basic block diagram of an exemplary embodiment of the web server 20 associated with the host website 12. The web server 20 may generally include a control system 34 having associated memory 36. The memory 36 may store the image modification software 26 and web server software 38. The memory 36 may optionally include cache 40. The web server 20 may also include a communication interface 42 for communicating with other network entities via the network 18 (FIG. 1). The communication interface 42 may also include an interface to various external devices. A user interface 44 may also be provided and may include a keypad, mouse, display, and the like (not shown).

Figure 11:
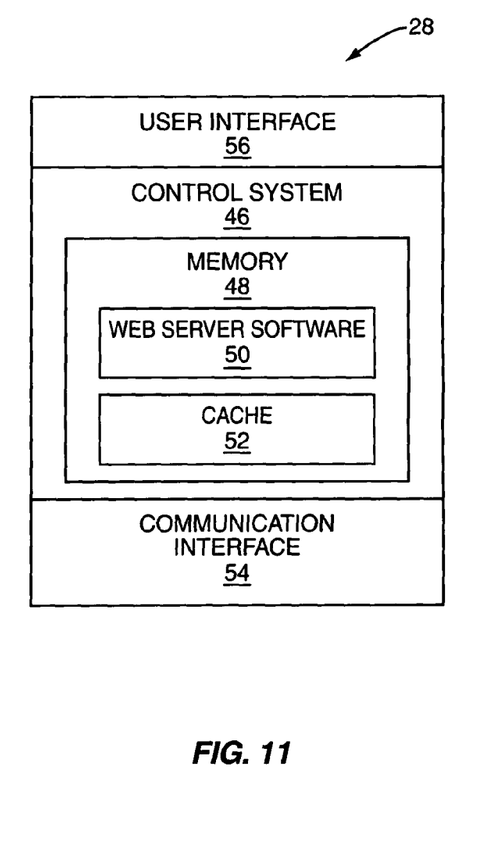
FIG. 11 is a basic block diagram of the web server associated with the external website of FIG. 1 according to one embodiment of the present invention.

FIG. 11 illustrates a basic block diagram of an exemplary embodiment of the web server 28 associated with the external website 14. The web server 28 may generally include a control system 46 having associated memory 48. The memory 48 may store web server software 50 and may optionally include cache 52. The web server 28 may also include a communication interface 54 for communicating with other network entities via the network 18 (FIG. 1). The communication interface 54 may also include an interface to various external devices. A user interface 56 may also be provided and include a keypad, mouse, display, and the like (not shown).

The present invention provides substantial opportunity for variation without departing from the spirit or scope of the present invention. For example, while the discussion above focuses mainly on adding a single advertisement or the like to a digital image to generate a modified image, any number of advertisements may be added to a digital image. For example, a first advertisement may be added along the top edge of the digital image and a second advertisement may be added along the bottom edge of the digital image. If the digital image is embedded as a web hyperlink, the hyperlink may direct the web browser 30 to a webpage at the host website 12 including a full resolution version of the image and/or advertisements corresponding to each of the advertisements included within the modified image.

Those skilled in the art will recognize improvements and modifications to the preferred embodiments of the present invention. All such improvements and modifications are considered within the scope of the concepts disclosed herein and the claims that follow.

What is claimed is:

1. A web server in a system for hosting a digital image embedded in an external website comprising:
   a) a communication interface coupled to a network; and
   b) a control system associated with the communication interface and adapted to:
      i) receive a request from a requesting node for one of a plurality of digital images embedded within the external website;
      ii) obtain the one of the plurality of digital images from an image database;
      iii) analyze metadata associated with the one of the plurality of digital images to provide selection criteria;
      iv) select additional content to add to the one of the plurality of digital images based on the selection criteria;
      v) modify the one of the plurality of digital images to add the additional content, thereby generating a modified image; and
      vi) provide the modified image to the requesting node.

2. The web server of claim 1 wherein the metadata comprises information stored in association with the one of the plurality of digital images.

3. The web server of claim 1 wherein the metadata is stored within an image file corresponding to the one of the plurality of digital images.

4. The web server of claim 1 wherein the metadata is stored within an application file associated with the web server.

5. The web server of claim 1 wherein the metadata comprises data selected from a group consisting of: a caption entered by a user associated with the one of the plurality of digital images, at least one keyword, a time stamp indicating a time and date at which the one of the plurality of digital images was captured, and location information indicating a location at which the one of the plurality of digital images was captured.

6. The web server of claim 1 wherein the control system is further adapted to modify the one of the plurality of digital images by adding pixels corresponding to the additional content to the one of the plurality of digital images.

7. The web server of claim 1 wherein the control system is further adapted to modify the one of the plurality of digital images by modifying pixels of the one of the plurality of digital images such that the additional content is added to the one of the plurality of digital images.

8. The web server of claim 1 wherein the control system is further adapted to store the modified image and serve the modified image in response to subsequent requests for the one of the plurality of digital images.

9. The web server of claim 1 wherein the requesting node is a guest node that provides the request in response to requesting and receiving a webpage having the one of the plurality of digital images embedded therein from the external website.

10. The web server of claim 9 wherein the control system is associated with a host website and the one of the plurality of digital images is embedded in the webpage from the external website as a web hyperlink to a predetermined Uniform Resource Locator (URL) associated with the host website.

11. The web server of claim 10 wherein the control system is further adapted to:
   receive a request for the predetermined URL from the guest node; and
   redirect the guest node to a website associated with the additional content added to the one of the plurality of digital images in response to receiving the request for the predetermined URL.

12. The web server of claim 1 wherein the control system is further adapted to receive the request from the one of the plurality of digital images from the external website.

13. A web server in a system for hosting a digital image embedded in an external website comprising:
   a) a communication interface;
   b) a control system associated with a hosting website and the communication interface and adapted to:
      i) receive a request for one of a plurality of digital images from a requesting node;
      ii) if the request is due to the one of the plurality of digital images being embedded within a webpage at the external website:
         A) obtain the one of the plurality of digital images from an image database;
         B) analyze metadata associated with the one of the plurality of digital images to provide selection criteria;
         C) select additional content to add to the one of the plurality of digital images based on the selection criteria;
         D) modify the one of the plurality of digital images to add the additional content, thereby generating a modified image; and
         E) provide the modified image to the requesting node;
      iii) if the request is due to the one of the plurality of digital images being embedded within a webpage at the hosting website:
         A) obtain the one of the plurality of digital images from the image database; and
         B) provide the one of the plurality of digital images to the requesting node.

14. The web server of claim 13 wherein the control system is further adapted to determine whether the request is due to the one of the plurality of digital images being embedded within the external website.

15. The web server of claim 14 wherein the request is a Hypertext Transfer Protocol (HTTP) request and the control system is further adapted to determine whether the request is due to the one of the plurality of digital images being embedded within the webpage at the external website by examining a HTTP referrer header field in the HTTP request.

16. The web server of claim 13 wherein if the request is due to the one of the plurality of digital images being embedded within the webpage at the external website, the control system is further adapted to select the additional content based on a geographic location of the requesting node.

17. The web server of claim 16 wherein the control system is further adapted to determine the geographic location of the requesting node based on an Internet Protocol (IP) address of the requesting node.

18. A method for hosting a digital image embedded in an external website comprising, at a host website:
   receiving a request at the host website from a requesting node for one of a plurality of digital images embedded within the external website;
   obtaining the one of the plurality of digital images from an image database;
   analyzing metadata associated with the one of the plurality of digital images to provide selection criteria;
   selecting additional content to add to the one of the plurality of digital images based on the selection criteria;
   modifying the one of the plurality of digital images to add the additional content, thereby generating a modified image; and
   providing the modified image from the host website to the requesting node.

19. The method of claim 18 wherein the metadata comprises data selected from a group consisting of: a caption entered by a user associated with the one of the plurality of digital images, at least one keyword, a time stamp indicating a time and date at which the one of the plurality of digital images was captured, and location information indicating a location at which the one of the plurality of digital images was captured.

* * * * *